US008244298B2

(12) United States Patent  
Luschi et al.

(10) Patent No.: US 8,244,298 B2  
(45) Date of Patent: Aug. 14, 2012

(54) ALTERNATIVE SIGNAL PROCESSING FUNCTIONS IN A SOFTWARE MODEM

(75) Inventors: Carlo Luschi, Oxford (GB); Steve Allpress, Bristol (GB); Simon Huckett, Bristol (GB)

(73) Assignee: ICERA Inc., Wilmington, DE (US)

( * ) Notice: Subject to any disclaimer, the term of this patent is extended or adjusted under 35 U.S.C. 154(b) by 1123 days.

(21) Appl. No.: 12/016,671

(22) Filed: Jan. 18, 2008

(65) Prior Publication Data

US 2009/0113429 A1    Apr. 30, 2009

(51) Int. Cl.  
H04B 1/16    (2006.01)

(52) U.S. Cl. .................................. 455/553.1; 455/188.1

(58) Field of Classification Search ............... 455/67.13, 455/550.1, 552.1, 553.1, 574, 101, 168.1, 455/188.1, 272, 273  
See application file for complete search history.

(56) References Cited

U.S. PATENT DOCUMENTS

| | | | | |
|---|---|---|---|---|
| 7,146,134 | B2 * | 12/2006 | Moon et al. .................. | 455/67.11 |
| 7,496,164 | B1 * | 2/2009 | Mostafa ......................... | 375/346 |
| 7,773,951 | B2 * | 8/2010 | Molnar et al. ............. | 455/67.13 |
| 2002/0060999 | A1 * | 5/2002 | Ma et al. ........................ | 370/335 |
| 2002/0183013 | A1 | 12/2002 | Auckland et al. | |
| 2004/0018853 | A1 * | 1/2004 | Lewis .......................... | 455/552.1 |
| 2004/0085917 | A1 * | 5/2004 | Fitton et al. .................... | 370/292 |
| 2004/0204026 | A1 * | 10/2004 | Steer et al. .................. | 455/550.1 |
| 2004/0249915 | A1 | 12/2004 | Russell | |
| 2006/0009209 | A1 | 1/2006 | Rieser et al. | |
| 2007/0211786 | A1 | 9/2007 | Shattil | |
| 2009/0110036 | A1 * | 4/2009 | Luschi et al. .................. | 375/148 |
| 2009/0110048 | A1 * | 4/2009 | Luschi et al. .................. | 375/232 |
| 2009/0110049 | A1 * | 4/2009 | Luschi et al. .................. | 375/233 |
| 2009/0111413 | A1 * | 4/2009 | Luschi et al. .................. | 455/230 |
| 2009/0203409 | A1 * | 8/2009 | Castor et al. .................. | 455/574 |

FOREIGN PATENT DOCUMENTS

| | | |
|---|---|---|
| EP | 1655872 A1 | 10/2006 |
| WO | WO9937099 A2 | 7/1999 |
| WO | WO03092231 A1 | 11/2003 |
| WO | WO2006/117562 | 11/2006 |
| WO | WO2007107805 A1 | 9/2007 |

OTHER PUBLICATIONS

Klein, A., *Data detection algorithms specially designed for the downlink of CDMA mobile radio systems*, IEEE Vehicular Technology Conference, Vo. 1, May 1997, pp. 203-207.

* cited by examiner

*Primary Examiner* — Blane J Jackson (57) ABSTRACT

Systems are described that reduce or obviate the impact of limited processing resources and/or limit the power consumption in a receiver having signal processing functions at least partially implemented in software. A wireless receiver includes reception means for receiving a signal over a wireless channel in a wireless external environment. The receiver includes storage means, and a processor configured to perform a plurality of signal processing functions for extracting processed data from said signal, each of said signal processing functions having a plurality of alternative software implementations requiring different levels of usage of a processing resource. The processor estimates at least one parameter relating to the external environment and selects and executes one of the software alternatives for each of the respective signal processing functions to apply a set of implementations adapted to a required quality of said processed data. Related methods and computer program products are described.

20 Claims, 4 Drawing Sheets

ALTERNATIVE SIGNAL PROCESSING FUNCTIONS IN A SOFTWARE MODEM

RELATED APPLICATION

This application claims priority to GB Application No.: 0721427.3, filed 31 Oct. 2007, the contents of which are incorporated herein by reference in its entirety.

FIELD OF THE INVENTION

The present invention relates to processing signals in a wireless network and particularly but not exclusively in a soft modem of a wireless cellular communications system.

BACKGROUND OF THE INVENTION

In the field of wireless communications, and particularly wireless cellular communications, there has been increasing interest in recent years in the idea of moving more of the signal processing functions of the transceiver into software. A transceiver with a tendency towards software implementation is sometimes referred to as a software modem, or "soft modem". The principle behind software modem is to perform a significant portion of the signal processing required for the wireless communications in a generic, programmable, reconfigurable processor, rather than in dedicated hardware.

An advantage of a soft modem type system is that it can be programmed and potentially reprogrammed to handle different protocols, algorithms, functions, radio access technologies and the like. For example, conventionally different radio access technologies would require different dedicated hardware to be included on a phone or other wireless terminal, and a terminal adapted to handle multiple radio access technologies or "multimode" terminal would have to include different sets of dedicated hardware. This problem is solved by software modem techniques, in which the differences in communicating according to different radio access technologies are handled in software. The processor could be programmed to handle both 2G and 3G cellular standards, including for example perhaps one or more of the GSM, UMTS, EDGE, DigRF, High Speed Downlink Packet Access (HSDPA), and High Speed Uplink Packet Access (HSUPA), and 3GPP Long Term Evolution (LTE) standards.

Alternatively or additionally, the use of software modem techniques may allow a manufacturer, distributor or vendor to buy a batch of generic or "standard agnostic" processors and then program them according to different radio standards and technologies for different customers or purposes. A soft modem could also be updated easily and inexpensively by reprogramming it to handle new or different technologies.

However, the difficulty in implementing a soft modem in practice is that, for a given processor, there may not be sufficient processing resources available to be able to provide as high a performance as would be preferred. This is especially likely to be the case in a relatively low cost consumer device such as a mobile phone. However, it would nonetheless be desirable that the soft modem's performance should be of a level that would be competitive with its hardware counterparts. In other cases, the constraint on the use of processing resources may not be set by the limit of the computational capabilities of the processor, but by the requirement to limit the power consumption of the device in general or under specific modes or operating conditions.

SUMMARY

It is an aim of the present invention to reduce or obviate the impact of limited processing resources and/or limit the power consumption in a receiver whose signal processing functions are implemented at least partially in software.

According to one aspect of the invention, there is provided a wireless receiver comprising:
reception means for receiving a signal over a channel in a wireless external environment;
a processor configured to perform a plurality of signal processing functions for extracting processed data from said signal, each of said signal processing functions having a plurality of alternative software implementations requiring different levels of usage of a processing resource; and
storage means for storing said alternative software implementations;
wherein the processor is configured to estimate at least one parameter relating to the external environment and, in dependence on said at least one parameter and on an availability of said processing resource, to select and execute one of the software alternatives for each of the respective signal processing functions so as to apply a set of implementations adapted to a required quality of said processed data.

Another aspect of the invention provides a method of processing a wireless signal in a wireless external environment;
estimating at least one parameter relating to the external environment;
determining an availability of at least one processing resource; and
in dependence on said at least one parameter and on an availability of said processing resource, selecting and executing one of a plurality of software alternatives for each of a plurality of signal processing functions for extracting processed data from said signal, each of said signal processing functions having a plurality of alternative software implementations requiring different levels of usage of a processing resource so as to apply a set of implementations adapted to a required quality of said processed data.

A further aspect of the invention provides a computer program product comprising:
a plurality of code blocks, each code block comprising a software implementation of a signal processing function, said software implementation requiring a level of usage of a processing resource;
estimation code means configured to estimate at least one parameter relating to an external wireless environment; and
selection code means adapted to select, in dependence on said one or more parameters and on an availability of said processing resource, one of the software alternatives for each of a plurality of signal processing functions so as to apply a set of implementations adapted to a required quality of said processed data.

The inventors have recognised that for any given signal processing function, there are usually a number of different possible software implementations or different versions of that function, each having a different processing cost; and furthermore that the preferred trade-off between these implementations will be dependent on channel conditions, network related operating conditions and/or system requirements, which will generally change over time. A trade-off would typically be required where the processing cost of the maximum-cost set of implementations would exceed the total available processing resources. But a trade-off may also be made for other reasons, such as to reduce power consumption possibly related to specific operating conditions or system requirements, or to reserve processing resources for other tasks that might potentially be handled by the processor.

The principle of the invention may be applied to processing received signals or for transmitter processing. However, its application is mainly related to the receiver processing, since for each standard the required transmitter processing is practically fixed by the specifications.

The parameter relating to the wireless external environment can be indicative of channel conditions, network operating conditions and/or system conditions. In this context, system requirements or conditions derive from the particular communication system and standard—for instance, quality requirement or error rate requirement for a given application as set by the wireless standard. It is distinct from the network operating conditions, which refer for example to cell load (number of users), traffic conditions, interference from the other cells, etc.

The processing resource can comprise at least one of a number of processor cycles; and an amount of memory, the memory comprising at least one of a random access memory, a cache and a set of registers.

The receiver can comprise means for determining said availability based on a maximum availability of the processing resource or an upper limit target constrained by power consumption.

The required quality can be based on at least one of error rate performance in recovering the transmitted data from the received signal (including bit error rate performance and block error rate performance); signal-to-distortion ratio required to achieve a specified error rate performance; time delay required to achieve a specified error rate performance (which includes the number of transmissions of the information data as specified by a retransmission scheme); a measurable distortion in the recovered data; and a likelihood of the receiver being dropped from a cell of a cellular network.

The receiver can comprise a selection criteria table which is accessible by the at least one parameter and the availability of processing resource, and which can accordingly supply information concerning the required software alternative for the required quality of processed data.

For a better understanding of the present invention and to show how the same may be carried into effect, reference will now be made by way of example to the accompanying drawings.

DETAILED DESCRIPTION OF THE PREFERRED EMBODIMENTS

Figure 1:
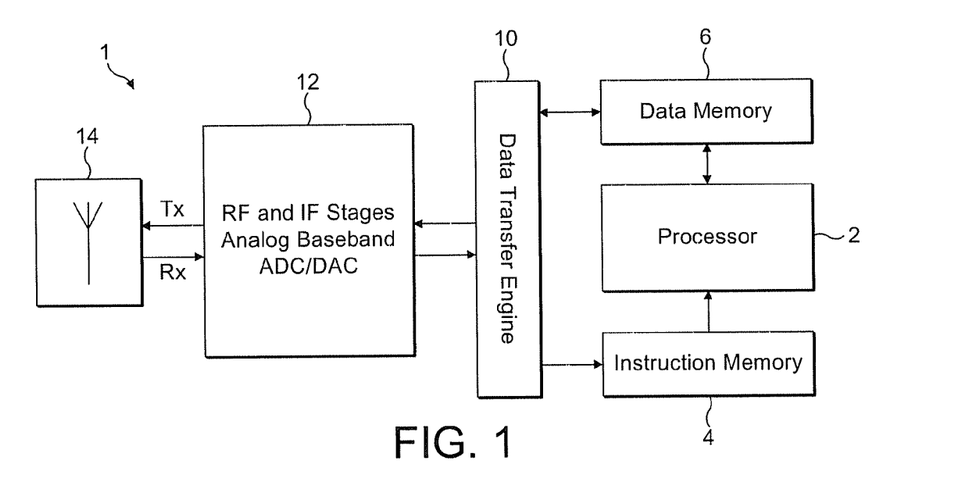
FIG. 1 shows an example platform for implementing the present invention.

FIG. 1 is a schematic block diagram of a device 1 for transmitting and receiving signals in a wireless communication system. Such a device can be realised in a number of different ways, but in the example of FIG. 1 a series of radio frequency (RF) and intermediate frequency (IF) stages 12 is arranged to receive and transmit wireless signals (Rx and Tx) via one or more antennas 14. The block 12 includes components for processing the received analogue radio signals Rx and providing digital signal samples r(k). This can be achieved in different ways which are known in the art.

The samples r(k) are supplied to a data transfer engine 10 which communicates with a processor 2, an instruction memory 4 and a data memory 6. The processor 2 is responsible for processing the samples r(k). The processor can execute a number of different functions which are held in the instruction memory 4 in the form of code sequences.

The device 1 may be referred to as a software modem, or soft modem. Preferably, the software modem is a soft baseband modem. That is, on the receive side, all the radio functionality from receiving RF signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain is implemented in software stored on the memory 4 and executed by the processor 2. While this is a preferred implementation, solutions where the RF/IF stage is not implemented by dedicated hardware are also envisaged.

In the preferred implementation, the dedicated hardware in the receive part of the RF/IF stages in block 12 may comprise a low noise amplifier, (LNA), mixers for downconversion of the received RF signals to IF and for downconversion from IF to baseband, RF and IF filter stages, and an analog to digital conversion (ADC) stage. An ADC is provided on each of in-phase and quadrature baseband branches for each of a plurality of receive diversity branches. The dedicated hardware in the transmit part of the RF/IF stages in block 12 may comprise a digital to analog conversion (DAC stage, mixers for upconversion of the baseband signals to IF and for upconversion from IF to RF, RF and IF filter stages, and a power amplifier (PA). Details of the required hardware for performing such basic radio functions will be known to a person skilled in the art.

The software modem may then handle functions such as:
Modulation and demodulation
Interleaving and deinterleaving
Rate matching and dematching
Modulation and demodulation
Channel estimation—Equalisation—Rake processing—Bit log-likelihood ratio (LLR) calculation—Transmit diversity processing—Receive diversity processing—Multiple transmit and receive antenna (Multiple-Input Multiple-Output, or MIMO processing
Voice codecs
Link adaptation through power control or adaptive modulation and coding
Cell measurements In a preferred embodiment, the chip used is manufactured by Icera and sold under the trade name Livanto®. Such a chip has a specialised processor platform described for example in WO2006/117562.

The invention is based around the idea that various signal processing functions usually have each a plurality of alternative, substitutable implementations, which realise a different trade-off between performance and complexity and/or are specifically aimed at different operating conditions.

Figure 2:
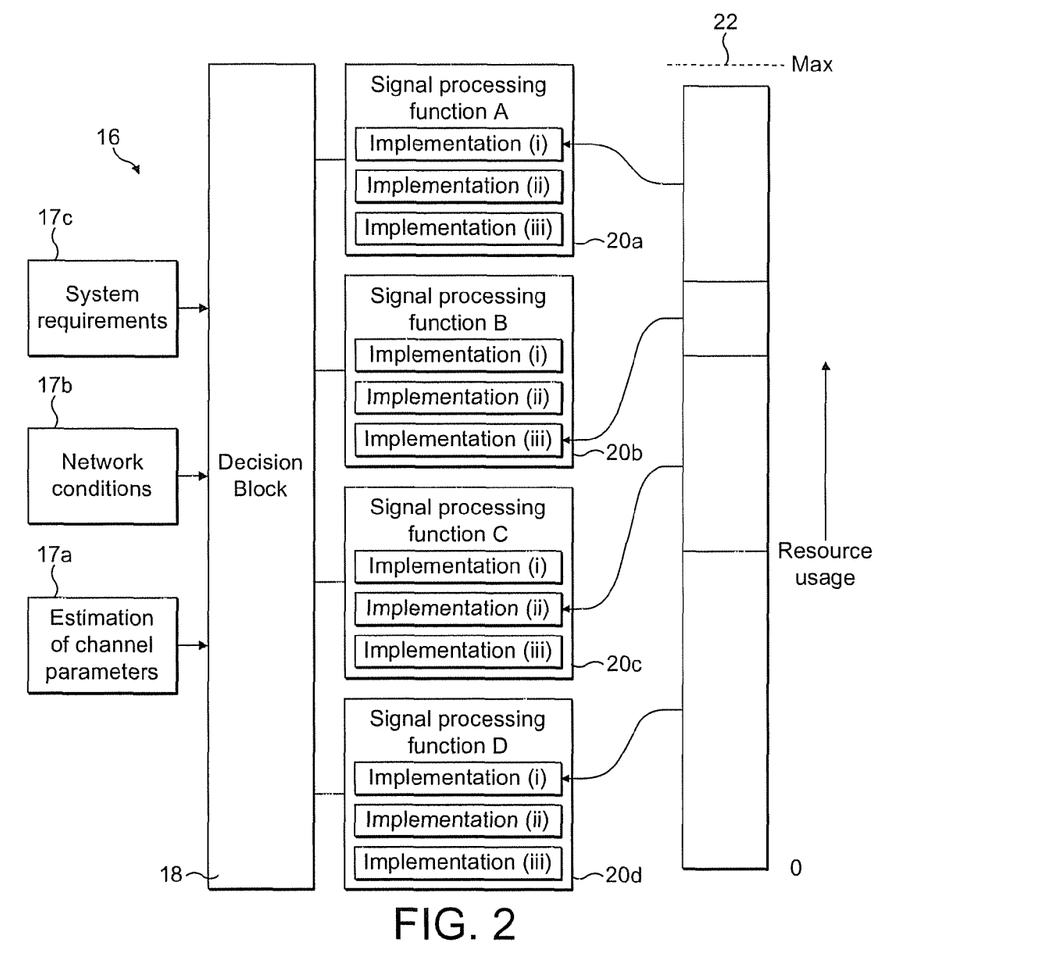
FIG. 2 is a schematic representation of the allocation of processing resources.

FIG. 2 is a highly schematised block diagram illustrating a resource management system 16 for exploiting this concept. The system 16 comprises a parameter estimation block 17a; a network-related operating condition block 17b; a systems requirement block 17c; a decision block 18 arranged to receive estimates from the blocks 17a, 17b, 17c; and a plurality of signal processing functions $20_a$ to $20_d$ each for processing signals received from the receiver front-end in block 12, each being arranged to receive a decision from the decision block 18, and each having a plurality of possible implementations $20_a(i)$-$20_a(iii)$, $20_b(i)$-$20_b(iii)$, etc. Note that the example of four functions A-D each with three possible implementations (i)-(iii) has been chosen purely for illustrative purposes. The system 16 could have any number of signal processing functions 20 each with any number of alternative implementations.

The system 16 is implemented in software, such that in practice each of the blocks 17a, 17b, 17c, decision block 18 and signal processing functions $20_a$-$20_d$ comprises a portion of code stored in the memory 4 and arranged to be executed by the processor 2.

In operation, the decision block 18 receives channel parameters indicative of indicative of channel conditions, inputs related to network related operating conditions, and system requirements. The decision block 18 is also aware of the availability of at least one processing resource to be managed. Preferably the processing resource is the number of processor cycles allocated to each signal processing function handled by the processor. An alternative or additional processing resource which may be taken into account by the decision block 18 is the availability of memory, either RAM, cache and/or registers. Other options may be apparent to a person skilled in the art, and "processing resource" may refer generally to any finite utility of a processor which is allocated to specific software tasks.

The "availability" may be the total maximum of that resource available, or an upper limit target constrained by some other factor such as power consumption.

By taking into account both the available resources and the channel conditions, the decision block makes a decision as to which of the alternative implementations to use for each of the signal processing functions $20_a$ to $20_d$. In the example circumstances shown in FIG. 2, the decision block 18 selects the first implementation $20_a(i)$ of the first function 20a, the third implementation $20b(iii)$ of the second function 20b, the second implementation $20c(ii)$ of the third function 20c, and the first implementation $20d(i)$ of the fourth function 20d, thus keeping the total allocated resources below a maximum limit 22. It may be that, given unlimited resources, the preferred set of implementations would be different for certain channel conditions. However, given a finite limit on resources, the decision block makes a trade-off between the different implementations to find the optimum compromise for the particular channel conditions in question. If channel conditions change, the trade-off may change and the decision block 18 may allocate a new set of implementations and thus redistribute the processing resource or resources.

The decision block 18 chooses the trade-off such that the impact of the limited resources is reduced, i.e. so the actual tangible effect experienced by the end user is reduced or ideally made negligible. Such tangible effects could include audible noise or distortion in a telephone call, loss of data (i.e. increased bit error rate), or the user being dropped from a cell.

The chosen trade-off may also be imposed not by a limit in the available resources, but by power consumption constraints possibly related to the specific operating conditions or system requirements.

Some specific examples are now described. First are described some examples of signal processing functions and their alternative implementations, and for each function how the ideal implementation could be chosen in dependence on channel conditions if processing resources were not limited.

Then is described an example of how the decision block 18 selects a "non-ideal" set of implementations when processing resources are limited.

As a person of ordinary skill will be aware, multi-path fading occurs where the signal travels from a transmitter to a receiver via multiple propagation paths resulting in the reception of multiple replicas of the same signal which interfere with one another. These different paths are due to reflection and obstruction by obstacles such as buildings or other objects. The result is that, over a range of positions, the received signal will be a superposition of multiple replicas of the signal received via multiple propagation paths. Over a range of positions, the received signal intensity thus displays a pattern of peaks and troughs caused by constructive and destructive interference of the different propagation paths.

Spatial receive diversity is a technique whereby a receiver is provided with a plurality of physically separated antennas. Each receive antenna corresponds to a respective propagation channel, which in this context results from the multiple propagation paths as experienced at a given receive antenna. The basic idea behind receive diversity is that if versions of the signal are received over differently fading propagation channels, then a combination of those different versions should not be overly degraded by fading. However, this increased "dimensionality" of the receiver also incurs an increased computational cost.

Figure 3:
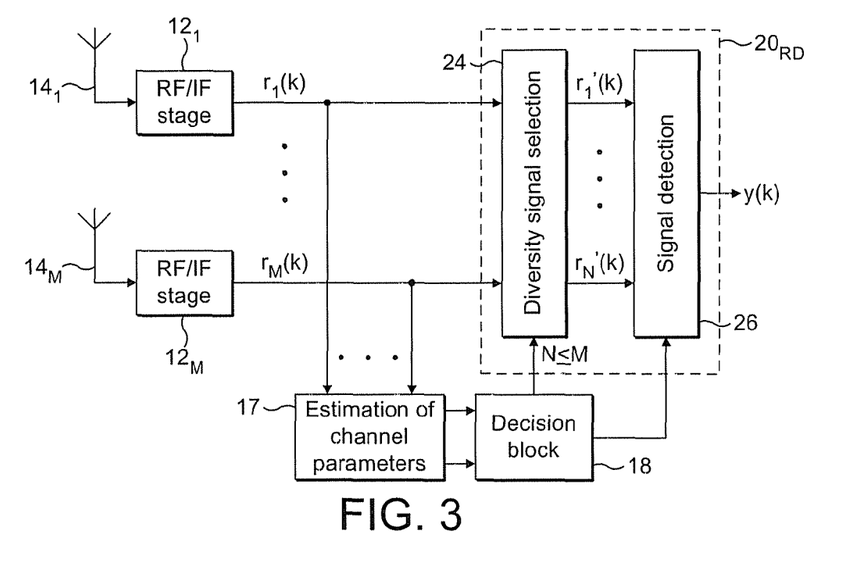
FIG. 3 is a schematic representation of a receive diversity processing function.

FIG. 3 shows a schematic block diagram in which one of the signal processing functions $20_{RD}$ comprises a receive diversity scheme. This receive diversity processing function $20_{RD}$ comprises a diversity signal selection block 24 and a signal detection block 26. The diversity signal selection block is arranged to receive signals $r_1(k)$ to $r_M(k)$, via the receiver front-end of block $12_1 \ldots 12_m$, from M respective antennas $14_1(k)$ to $14_M(k)$ corresponding to M propagation channels. The receive diversity function $20_{RD}$ is further arranged to receive an input from the decision block 18, and to output N signals $r_1'(k)$ to $r_N'(k)$. The signal detector is arranged to receive the N signals $r_1'(k)$ to $r_N'(k)$ and to output a combined signal $y(k)$. The parameter estimation block 17a is also arranged to receive the M signals $r_1(k)$ to $r_M(k)$.

The receive diversity function $20_{RD}$ is implemented in software, such that in practice each of the blocks 17a, 17b, 17c, decision block 18, diversity signal selection block 24 and signal detection block 26 comprises a portion of code stored in the memory 4 and arranged to be executed by the processor 2.

In operation, the parameter estimation block 17 estimates channel parameters indicative of channel conditions for each propagation channel, and outputs the estimated channel parameters to the decision block 18. Network related operating conditions and/or system requirements are also monitored (17b, 17c) and supplied to decision block 18. The decision block 18 controls not only block 24 but also block 26, to determine the dimensionality of the diversity processing. Based on these parameters, the decision block 18 outputs a decision N to the diversity signal selection block 24, N being the number of signals $r_1'(k) \ldots r_N'(k)$ which are to be combined from the possible M received signals $r_1(k) \ldots r_M(k)$, where $N \leq M$. The signal detector 26 then combines the N selected signals $r_1'(k) \ldots r_N'(k)$ using a detection algorithm based for instance on minimum mean squared error combining (MMSE) processing or maximum ratio combining (MRC), the details of which will be known to a person skilled in the art. M can be any number from two upwards, and N can be any number from 1 to M inclusive.

The higher the degree of diversity selected, i.e. the higher N, the more processing resources are needed to process the signals $r_1'(k) \ldots r_N'(k)$. But an increased diversity only provides a performance advantage in certain channel conditions, which may vary with time. Therefore the decision block 18 must balance the benefit against computational cost.

For sufficient spatial separation between the receive antennas 14 (relative to the carrier wavelength of the radio transmission), the received versions of the signal at the different antennas 14 are characterized by uncorrelated channels (i.e., have channel impulse responses with independently fading tap-weights). If the signals received at the different antennas are characterized by uncorrelated channels, this system realizes a diversity gain, which can be exploited to improve the error performance of the receiver. The diversity gain and the corresponding performance advantage decrease for an increased correlation between the diversity channels.

Nonetheless, even in the presence of correlated channels, antenna diversity can still provide a performance advantage in terms of a power gain, which is maximum when the signals on the different diversity branches are affected by uncorrelated disturbance (a general term for noise and/or interference, and preferably the sum of noise and interference). This gain decreases for an increased correlation of the disturbance on the different diversity branches.

An estimate of the signal-to-disturbance ratio may also be therefore taken into account to evaluate if the performance advantage of receive diversity processing is likely to derive mainly from fading diversity (diversity gain) or uncorrelated disturbance (power gain)—this in turn allows to make an appropriate use of specific estimates of the correlation between different diversity channels and of the correlation of the disturbances on different diversity branches.

To take advantage of this observation, the adaptive receiver structure discussed herein dynamically selects (on the basis of channel conditions) to perform signal detection relying on all the available receive diversity signals or on a subset of the available receive diversity signals—down to the possible use of a single received signal, in which case the receiver processing does not exploit antenna diversity.

So in one example, the decision block 18 may determine that the use of receive diversity between any two propagation channels provides a worthwhile performance advantage if:
  (a) the correlation between the propagation channels is low enough and the signal-to-disturbance ratio on each channel is high enough; or
  (b) the correlation between the propagation channels is high, but the signal-to-disturbance ratio on each channel is low and the correlation of the disturbance on each channel is low enough;

but that otherwise the performance advantage does not outweigh the increased computational cost (i.e. use of processing resources) that would be incurred by the diversity.

Correlation is a statistical measurement, and details of how to calculate a correlation will be known to a person skilled in the art.

By calibrating appropriate thresholds for the channel correlation, signal-to-disturbance ratio (SRD) and/or correlation of the disturbance (the actual threshold level is a matter of design choice), the decision block 18 can be used to determine whether diversity processing based on signals from a pair of antennas 14 would provide a significant performance advantage, and if so to select them for processing according to a specified receive diversity scheme. If there are more than two pairs in the array, the decision block 18 can assess various different combinations of pairings of the antennas $14_1 \ldots 14_M$ and thus determine which and how many of the M antennas' signals to process.

Further details of this diversity selection are described in UK patent application "Wireless Receiver with Receive Diversity", Page White & Farrer Ref. 315723.GB.

Figure 4:
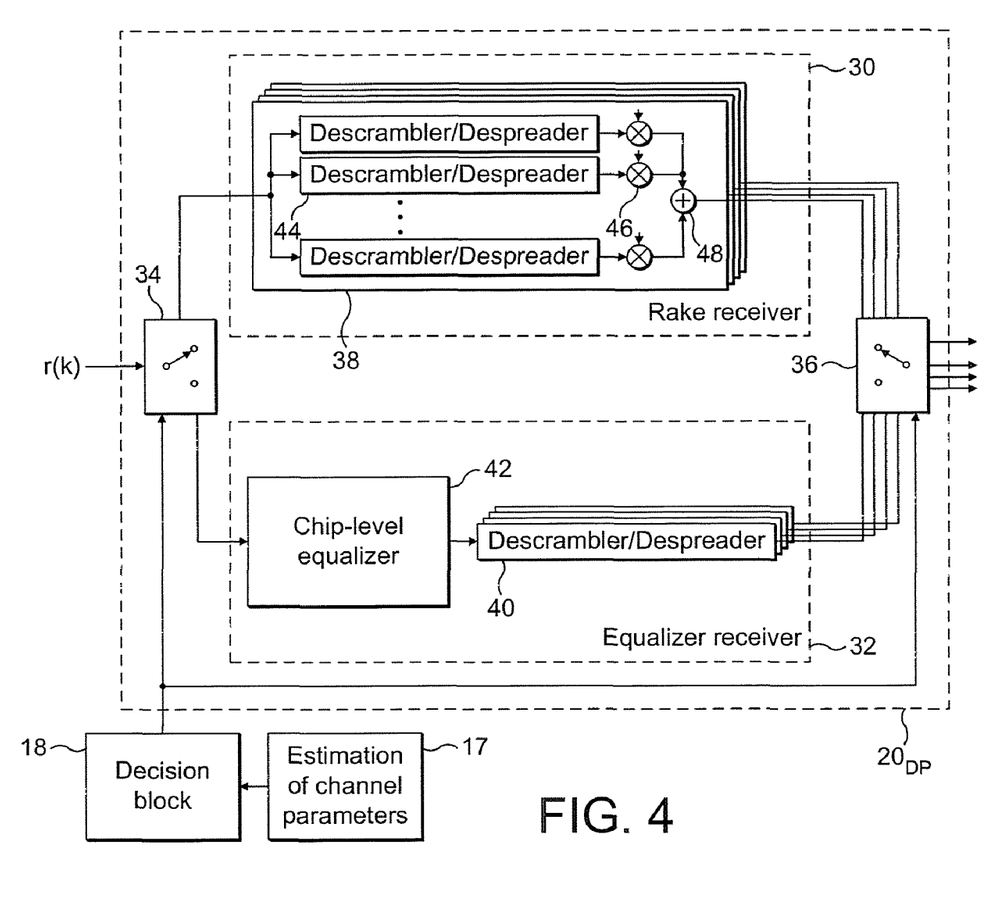
FIG. 4 is a schematic representation of a signal detection processing function.

As discussed in relation to FIG. 4, other examples of alternative implementations of a signal processing function include an equaliser and a rake receiver.

A rake processor is described for example in J. G. Proakis, "Digital Communication", New York: McGraw-Hill, 1995. This type of receiver is subject to performance degradation in the presence of code correlation, if the MAI (multiple access interference) between code-multiplexed transmission is comparable to the other sources of noise and interference. Under these conditions, a performance advantage may be achieved by attempting to restore the orthogonality between the codes before despreading. The sub-optimality of conventional 3GPP receivers based on rake processing causes a significant performance penalty, especially for downlink data rates increasing from the 384 kbps for WCDMA Release 99 to High Speed Downlink Packet Access (HDSPA) rates of several Mbps. When the code orthogonality is destroyed by multipath, an effective approach is to use channel equalisation instead of rake processing.

Channel equalisation techniques have been widely employed over the last decades for combating intersymbol interference on frequency selective transmission channels. Channel equalization techniques are described in J. G. Proakis, "Digital Communication", New York: McGraw-Hill, 1995, and S. Benedetto, E. Biglieri, and V. Castellani, "Digital Transmission Theory", Englewood Cliffs, N.J.: Prentice-Hall, 1987. Channel equalisers have recently found application in receivers for Time Division Multiple Access (TDMA) and Code Division Multiple Access (CDMA) mobile wireless systems. An example of application of channel equalisation to a CDMA cellular system is described in A. Klein "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207. In particular in synchronous CDMA cellular systems, as in the case of the forward link of the 3GPP WCDMA standard, chip level equalisation allows to significantly improve the performance over conventional rake receivers, at the cost of an increased implementation complexity. This advantage is especially important for high rate data transmission, as in 3GPP high speed downlink packet access (HSDPA).

Whether it would be more appropriate to use an equaliser or a rake receiver for signal detection will depend on the channel characteristics, which may vary over time.

Thus in embodiments, the present invention may be configured to select between the use of either a rake receiver or an equaliser based on an estimate of the relevant operating conditions, derived from channel parameters, network parameters or system parameters. The approach may extend to the selection of specific rake receiver or equaliser design parameters, and/or to the selection of an appropriate equalisation algorithm, for the best trade-off between achievable performance and implementation complexity (and therefore computational cost).

FIG. 4 is a schematic block diagram showing a signal detection function $20_{DP}$ arranged to receive an input from the decision block 18, which in turn is arranged to receive an input from the parameter estimation block 17. The signal detection function $20_{DP}$ comprises a first switching block 34, a second switching block 36, a rake receiver 30 and an equaliser receiver 32.

The rake receiver 30 comprises a plurality of rake processing blocks 38 relative to different CDMA channels, each rake 38 comprising a plurality of descrambler/despreaders 44, a plurality of respective multipliers 46, and an adder 48. The equaliser receiver 32 comprises a chip-level equaliser 42 and a plurality of descrambler/despreaders 44, one for each CDMA channel. The switching block 34 is arranged to receive an input signals (k), which is derived from the receiver front-end of block 12 and to pass it to a selected one of the rake receiver 30 and equaliser 32.

In the rake receiver 30, each descrambler/despreader 44 is arranged to receive an input, if selected, from the switching block 34. Each multiplier 46 is arranged to receive the output of its respective descrambler/despreader 44, and the adder 48 is arranged to receive the outputs of all the multipliers 46 of the rake processing block 38 in question. Each descrambler/despreader 44 and its respective multiplier 46 makes up a respective finger of the rake receiver.

In the equaliser receiver 32, the chip-level equaliser 42 is arranged to receive an input, if selected, from the switching block 34. Each descrambler/despreader 40 is arranged to receive the output of the chip-level equaliser 42.

The switching block 36 is arranged to receive the outputs of each of the adders 48 in each of the rake processing blocks 38 of the rake receiver 30, and to receive the outputs of each of the descrambler/decoders 40 of the equaliser receiver 32.

The signal detection function $20_{DP}$ is implemented in software, such that in practice each of the parameter estimation block 17, decision block 18, switching blocks 34 and 36, rake receiver 30 and equaliser receiver 32 comprises a portion of code stored in the memory 4 and arranged to be executed by the processor 2. This includes the descrambler/despreaders 40 and 44, chip-level equaliser 42, multipliers 46 and adder 48.

In operation, the parameter estimation block 17 estimates channel parameters indicative of channel conditions for each propagation channel, and outputs the estimated channel parameters to the decision block 18. Based on these parameters, the decision block 18 outputs a decision to the switching blocks 34 and 36 to divert the incoming signal y(k) through either the rake receiver or the equaliser receiver 32. The decision blocks 18 also receives inputs related to network related operating conditions and/or system requirements.

If the rake receiver 30 is selected, the signal y(k) is directed to each of the rake processing blocks channel branches 38. Each rake processing block 38 applies a different channelisation code (i.e. spreading code) to recover the respective channel from the multiplexed input. Within a given rake processing block 38, the signal r(k) is input to each of the descrambler/despreaders 44 where it is correlated with the channelisation code for that channel at the appropriate time delay. This time delay is different on different fingers, in order to separate out different multipath channel components of the received signal. Each component is then weighted by the respective multiplier 46 to perform maximum ratio combining (MRC). Details of a rake receiver will be familiar to a person skilled in the art.

If the equaliser receiver 32 is selected, the signal r(k) is directed to the chip-level equaliser 42 which applies an algorithm to compensates for the time response of the channel using a tapped delay line filter. The resulting output of the equaliser 42 is passed to the descrambler/despreaders 40 where the channelisation codes are applied for each channel.

The output from the selected one of the rake receiver 30 and the equaliser receiver 32 is output from the signal detection function $20_{DP}$ by means of the switching block 36.

Possible ways in which the decision block 18 may select between the rake receiver 30 and equaliser 32 are now discussed.

Conventional code division multiple access (CDMA) receivers based on rake processing are subject to performance degradation due to a loss of orthogonality between channelisation codes in the presence of multi-path propagation. As will be familiar to a person skilled in the art, in CDMA wireless systems different physical channels are multiplexed into the code domain using separate spreading sequences, i.e. channelisation codes. For orthogonal spreading code-words, the original data symbols can then be effectively separated at the receiver by de-spreading. But spreading codes are only orthogonal to one another under the condition of perfect time alignment. In the presence of multi-path propagation, the code orthogonality is lost, and the operation of de-spreading is affected by multiple access interference (MAI).

A rake processor relies on the correlation properties of the spreading sequences and is subject to performance degradation in the presence of code correlation, if the MAI between code-multiplexed transmissions is comparable to other sources of noise and interference.

For synchronous CDMA transmission, e.g. in the case of the forward link of the 3GPP W-CDMA standard, an effective approach for solving the above problem when the orthogonality is destroyed by multi-path is to use a chip-level channel equaliser. The use of channel equalisation generally produces a significant performance advantage over conventional rake reception, at the cost of an increased implementation complexity and therefore computational cost in terms of processing resources. The advantage is particularly important for high data rate transmission, as in 3GPP High-Speed Downlink Packet Access (HSDPA).

However, the inventors have observed that channel equalisation may not be able to provide superior performance in the presence of low geometry (i.e. a high level of received noise plus inter-cell interference compared to the total received power), in the presence of high Doppler spread (corresponding to a highly time-varying propagation channel), in the presence of high channel delay spread (corresponding to a possible channel energy loss due to a limited channel estimation window). Channel equalisation may also not be able to provide superior performance if the error in the equalisation coefficients is too high, for example as a consequence of errors in the estimation of the channel impulse response. Channel equalisation may also not be able to provide superior performance if the equaliser is unable to counteract the effect of the multi-path channel in the presence of particular channel characteristics, such as in the case of linear equalisation and channel transfer function with zeros close to the unit circle of the z-plane. Other scenarios are also possible.

In one example, the decision block 18 may determine that the use of the rake receiver 30 is to be preferred to the use of the channel equaliser 32 if it cannot provide a significant enough performance advantage to justify the additional implementation complexity and power consumption. As a specific example, the decision block 18 may determine not to use the equaliser 32, if:

(a) the estimated Doppler spread (or maximum Doppler frequency) is too high;
(b) the channel delay spread is too high, e.g. measured in terms of the channel energy outside the time window used for channel estimation or in general for computation of the equaliser coefficients;
(c) the channel zeros in the z-plane that identify channel characteristics that are critical for the operation of the equaliser are in certain positions, e.g. with zeros too close to the unit circle for linear equalisation, or with common zeros among equaliser subchannels for fractionally spaced equalisation;

(d) the estimated cell geometry is too low, e.g. the ratio between received intra-cell power and the noise plus inter-cell interference power is too low, or the ratio between noise plus inter-cell interference power and total received power is too high;
but that otherwise the equaliser receiver 32 should be selected in favour of the rake receiver 30.

By calibrating suitable thresholds for the estimated Doppler estimate, delay spread, channel zeros and cell geometry (the actual threshold levels are a matter of design choice), the decision block 18 can thus be used to select between the rake receiver 30 and the equaliser receiver 32.

Furthermore, the limitations of the equaliser generally depend on the particular equaliser algorithm under consideration, and each algorithm will also have a different computational cost. Therefore, the selection of alternative implementations of the signal detection function may alternatively or additionally comprise selecting between different equaliser algorithms.

For example, the decision block 18 may select between a linear and a non-linear equaliser structure. The criterion for this selection may be based on the location of channel zeros in the z-plane, e.g. zeros too close to the unit circle for linear equalisation may rule out a Baud-spaced linear equaliser. In addition, this selection could depend on specific transmission conditions. For instance, in an HSDPA system, the use of a decision feedback equaliser may be limited to a condition where the user is allocated a significant portion of the downlink power—which determines the portion of the downlink signal that can be used for decision feedback without requiring decision to be made on other users' data.

Further, the decision block 18 may select between a baud-spaced or fractionally-spaced equaliser structure for the equaliser algorithm. This may also be based for instance on the location of channel zeros, and should take into account the amount of excess transmission bandwidth. Either baud-spaced or fractionally-spaced design can be used with either the linear or non-linear selections.

Further, the decision block 18 may select between a minimum mean square error (MMSE) criterion, least squares (LS) criterion or zero forcing (ZF) criterion for the equaliser algorithm, or a criterion based on a different cost including the maximum-likelihood (ML) criterion and the maximum a posteriori probability (MAP) criterion. Factors that may be used to select between these criteria include an estimate of the signal-to-disturbance radio or other estimates indicative of the statistical distribution of the disturbance. For instance, it may be that acceptable performance can be obtained for high signal-to-disturbance ratios using the ZF criterion. On the other hand, the use of an LS equaliser may be preferable with respect to an MMSE equaliser in the presence of a non-Gaussian distribution. Any of ZF, LS or MMSE can be used in conjunction with either baud-spaced or fractionally-spaced and either linear or non-linear structures.

Further, the decision block 18 may select between block processing or the implementation of a tap adaptation rule. The selection between these two strategies may be made dependent on the degree of channel non-stationarity or temporal selectivity, e.g. through an estimate of the Doppler spread.

The selection of alternative implementations of the signal detection function may alternatively or additionally comprise selecting between different equaliser parameters for an equaliser algorithm.

For example, the time window for estimation of the channel impulse response may be selected based on an estimate of the channel delay spread. This selection may also depend on an estimate of the cell geometry or of the input signal-to-disturbance ratio, and/or on an estimate of the signal-to-disturbance ratio of the estimated channel coefficients. Cell geometry can be estimated as described in our Application No., Page White & Farrer Ref. 316036GB.

Further, the memory of an appropriate filter for estimation of the channel impulse response, or the frequency of update of the estimated channel impulse response, may be selected on the basis of an estimate of the degree of channel non-stationarity or temporal selectivity, for example through an estimate of the channel Doppler spread. The selection of the channel estimation filter could also be based on an estimate of the cell geometry or of the input signal-to-disturbance ratio, and/or on an estimate of the signal-to-disturbance ratio of the estimated channel coefficients.

Further, at intermediate to low signal-to-noise-plus-interference ratios, the total channel estimation error can be reduced by setting to zero the estimated channel coefficients with amplitude lower than a suitable threshold. The value of this threshold may be based on an estimate of the cell geometry or of the input signal-to-disturbance ratio, and/or on an estimate of the signal-to-disturbance ratio for the estimated channel coefficients.

Further, the memory of appropriate filters for estimation of the input noise variance in the case for example of MMSE equalisation may be made adaptive in the presence on non-stationary input noise by measuring the degree on non-stationarity (the time interval over which the noise is approximately constant). Or on a different basis, the filtering may depend on the periodicity with which it is convenient to collect observations on the input noise—this in turn may be motivated simply by the need to reduce complexity in specific operating conditions or under critical processing requirements.

Further, the number of equaliser coefficients (i.e. the equaliser time span) may be selected for example on the basis of estimates of the channel length or channel delay spread and the position of the channel zeros in the z-plane. The number of feedforward and feedback equaliser coefficients in the case of decision feedback equalisation may similarly be based on estimates of channel length or the channel delay spread and the position of channel zeros in the z-plane.

Further, the frequency of update of the equaliser coefficients in the case of block equalisation, or the coefficient step size in the case of adaptive equalisation, may be selected on the basis of an estimate of the degree of channel non-stationarity or temporal selectivity, e.g. through an estimate of a channel Doppler spread.

Further, the equaliser delay may be selected on the basis of an estimate of the channel phase characteristics derived from location of channel zeros in the z-plane.

The selection of alternative implementations of the signal detection function may alternatively or additionally comprise selecting between different rake algorithms. This could involve selection of an appropriate filter for the estimation and tracking of channel taps, the selection of the number of rake fingers, and the adoption of a specific strategy for the decision on finger combining. It could also include enhanced processing based on a rake structure like the so-called generalised rake algorithm.

Further details of equaliser and rake selection can be found in UK patent applications "A Radio Receiver in a Wireless Communication System", our ref. 315668.GB ("Adaptive Algorithm Selection"); and "A Radio Receiver in a Wireless Communication System", our ref. 315878.GB ("Adaptive Parameter Selection").

The above described concept is also applicable to different implementations for convolutional and turbo decoding and different implementation for the calculation of the bit lot-likelihood ratios for channel decoding (or in general for the calculation of the bit reliability information for channel decoding).

Above have been described some example signal processing functions 20 and some example criteria which could be used to select between alternative implementations of each of those functions if considered in isolation. However, this ignores the fact that such signal processing functions 20 would typically run on the same processor 2 which may have limited processing resources available. In that case, each function 20 cannot necessarily be considered in isolation because there may be competition for processing resources, for example if the ideal set of implementations exceeded the maximum available resources or incurred too high a power consumption. In such cases, the decision block 18 must arbitrate between the various signal processing functions 20 and their alternative implementations to find a trade-off which minimises the overall impact on the end user.

The objective is to manage the processing resources for the best trade-off between performance and required processing resources and/or between performance and related power consumption, under the constraint of limited processing resources or with the aim of maintaining the power consumption below a certain maximum value, depending on channel conditions, network related operating conditions and/or system requirements.

Figure 5:
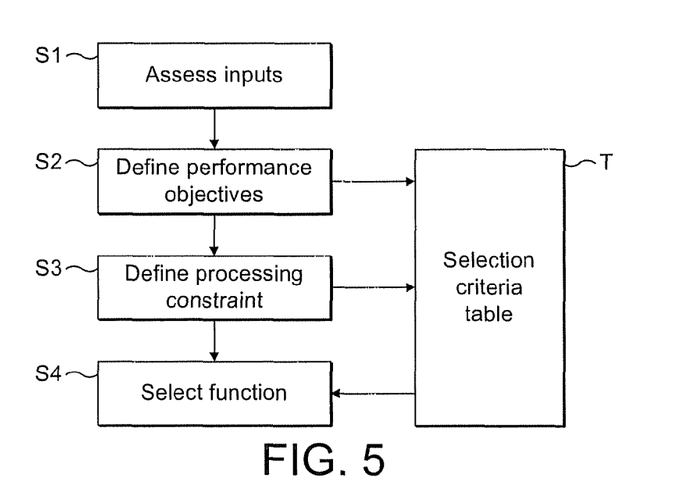
FIG. 5 is a schematic diagram of a function selection process.

Reference will now be made to FIG. 5 which is a schematic diagram illustrating a specific example of how the above objective can be achieved. At step S1, information on channel conditions, network related operating conditions and/or system requirements are used to determine the performance objectives (S2). At step S3, the relevant processing constraints are defined, for example maximum processing resources/power consumption. The performance objectives and processing constraints are supplied to a selection criteria table or tables T to allow a function to be selected at step S4 based on the selection criteria in these tables. The above solution has the advantage of providing improved receiver performance over the set of possible channel realisations, with respect to either of the different algorithms that perform each individual signal processing functions. For instance, consider again the case of the selection between a rake receiver or a channel equaliser to implement signal detection. In a software implementation of the receiver, where only either rake or equaliser processing is performed at any given time, the above approach also provides an overall reduction of computational complexity with respect to a conventional receiver implementing a channel equaliser. In this respect, conventional modems based on hardware implementation are forced to the choice between a design dictated by the maximum data rate requirements and the instantiation of multiple algorithms as separate areas of silicon. These solutions imply higher implementation cost, size and/or power consumption, and any compromise would inevitably penalise performance. On the other hand, the above solution allows a reduction in complexity, size and cost by reusing a common platform to adaptively select the optimum set of signal processing functions capable of maximising performance and minimise power consumption.

It will be appreciated that the above embodiments are described only by way of example. Particularly, the present invention is not limited to any of the example signal processing functions, examples of their alternative implementations, or example criteria for selecting between those alternatives described above. Other uses and configurations will be apparent to the person skilled in the art. The scope of the invention is not limited by the described embodiments, but only be the following claims.

The invention claimed is:

1. A wireless receiver comprising:
reception means for receiving a signal over a channel in a wireless external environment;
a processor configured to perform a plurality of signal processing functions for extracting processed data from said signal, each of said signal processing functions having a plurality of alternative software implementations that are substitutable for performing said each of said signal processing functions and that require different levels of usage of a processing resource; and
a memory storing for each of the plurality of signal processing functions its plurality of alternative software implementations in the form of code portions, each alternative software implementation requiring different levels of usage of a processing resource for extracting said processed data from said signal when executed by the processor to implement the signal processing function;
wherein the processor is configured to estimate at least one parameter relating to the external environment and, in dependence on said at least one parameter and on an availability of said processing resource, to select and execute one of the software alternatives for each of the respective signal processing functions so as to apply a set of implementations adapted to a required quality of said processed data.

2. The receiver of claim 1, wherein said processing resource comprises at least one of:
a number of processor cycles; and
an amount of memory, the memory comprising at least one of a RAM, a cache and a set of registers.

3. The receiver of claim 1, comprising means for determining said availability based on one of: a maximum availability of said processing resource, and an upper limit target constrained by power consumption.

4. The receiver of claim 1, wherein said required quality is based on at least one of: error rate performance in recovering the transmitted data from the received signal, signal-to-distortion ratio required to achieve a specified error rate performance; time delay required to achieve a specified error rate performance; a measurable distortion in the recovered data; and a likelihood of the receiver being dropped from a cell of a cellular network.

5. The receiver of claim 4, wherein the error rate performance comprises at least one of bit error rate and block error rate.

6. The receiver of claim 1, wherein one of said signal processing functions comprises a signal detection function.

7. The receiver of claim 6, wherein the signal detection function comprises a receive diversity function, alternative implementations of which correspond to processing of different numbers of signals received on separate transmission propagation channels.

8. The receiver of claim 6, wherein the alternative implementations of the signal detection function comprise a rake receiver and an equaliser.

9. The receiver of claim 6, wherein the alternative implementations of the signal detection function comprise a plurality of different equaliser algorithms.

10. The receiver of any of claims 6 to 9, wherein the alternative implementations of the signal detection function comprise a plurality of different equaliser parameters.

11. The receiver of claim 1, comprising a selection criterion table accessible by said at least one parameter and said availability of processing resource.

12. The receiver of claim 1, wherein the at least one parameter is indicative of channel conditions, network operating conditions or system conditions.

13. A method of processing a wireless signal in a wireless external environment;
estimating at least one parameter relating to the external environment;
determining an availability of at least one processing resource; and
in dependence on said at least one parameter and on an availability of said processing resource, selecting and executing on a processor one of a plurality of software alternatives for each of a plurality of signal processing functions for extracting processed data from said signal, each of said signal processing functions having a plurality of alternative and substitutable software implementations in the form of code portions, each alternative and substitutable software implementation requiring different levels of usage of a processing resource for extracting processed data from said signal when executed by the processor to implement the signal processing function so as to apply a set of implementations adapted to a required quality of said processed data.

14. The method of claim 13, wherein said processing resource comprises at least one of:
a number of processor cycles; and
an amount of memory, the memory comprising at least one of a RAM, a cache and a set of registers.

15. The method of claim 13, wherein said availability comprises determining based on one of: a maximum availability of said processing resource, and an upper limit target constrained by power consumption.

16. The method of claim 13, wherein said required quality is based on at least one of: error rate performance in recovering the transmitted data from the received signal; signal-to-distortion ratio required to achieve a specified error rate performance; time delay required to achieve a specified error rate performance, which includes a number of transmission of the information data as specified by a retransmission scheme; a measurable distortion in the recovered data; and a likelihood of the receiver being dropped from a cell of a cellular network.

17. The method of claim 13, wherein the error rate performance comprises at least one of bit error rate and block error rate.

18. The method of claim 13, comprising supplying the at least one parameter and said availability to a selection criterion table thereby to select the software alternative.

19. The method of claim 13, wherein the at least one parameter is indicative of channel conditions, network operating conditions or system conditions.

20. A computer program product comprising:
a plurality of code blocks, each code block comprising a substitutable software implementation of a signal processing function, each software implementation requiring different levels of usage of a processing resource for extracting processed data when executed by a processor to implement the signal processing function;
estimation code means configured to estimate at least one parameter relating to an external wireless environment; and
selection code means adapted to select, in dependence on said one or more parameters and on an availability of said processing resource, one of the substitutable software alternatives for each of a plurality of signal processing functions so as to apply a set of implementations adapted to a required quality of said processed data.

* * * * *